United States Patent
Sinha et al.

(10) Patent No.: US 12,417,245 B2
(45) Date of Patent: Sep. 16, 2025

(54) SCALABLE VIDEO FINGERPRINTING FOR CONTENT AUTHENTICITY

(71) Applicant: Adobe Inc., San Jose, CA (US)

(72) Inventors: Ritwik Sinha, Cupertino, CA (US); Viswanathan Swaminathan, Saratoga, CA (US); Simon Jenni, Hagendorf (CH); Md Mehrab Tanjim, San Diego, CA (US); John Collomosse, Woking (GB)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/473,045

(22) Filed: Sep. 22, 2023

(65) Prior Publication Data

US 2025/0103649 A1   Mar. 27, 2025

(51) Int. Cl.
| | |
|---|---|
| *G06F 16/73* | (2019.01) |
| *G06F 16/732* | (2019.01) |
| *G06F 16/738* | (2019.01) |
| *G06F 16/75* | (2019.01) |

(52) U.S. Cl.
CPC ........ *G06F 16/7328* (2019.01); *G06F 16/738* (2019.01); *G06F 16/75* (2019.01)

(58) Field of Classification Search
CPC .... G06F 16/7328; G06F 16/738; G06F 16/75; G06F 16/70
See application file for complete search history.

(56) References Cited

U.S. PATENT DOCUMENTS

| | | | | |
|---|---|---|---|---|
| 7,016,540 | B1* | 3/2006 | Gong | G06F 16/785 |
| | | | | 348/703 |
| 2002/0028021 | A1* | 3/2002 | Foote | G06V 20/48 |
| | | | | 382/224 |
| 2008/0181536 | A1* | 7/2008 | Linden | H04M 1/72451 |
| | | | | 382/313 |
| 2010/0306193 | A1* | 12/2010 | Pereira | G06F 16/7328 |
| | | | | 707/E17.014 |
| 2012/0143915 | A1* | 6/2012 | Gupta | G06F 16/7847 |
| | | | | 707/780 |
| 2015/0120750 | A1* | 4/2015 | Hefeeda | G06F 16/9027 |
| | | | | 707/741 |
| 2017/0024614 | A1* | 1/2017 | Sanil | G06F 16/70 |
| 2017/0060862 | A1* | 3/2017 | Wang | G06F 16/783 |
| 2017/0192980 | A1* | 7/2017 | Pereira | G06T 7/11 |
| 2018/0020243 | A1* | 1/2018 | Ni | H04N 21/23418 |

(Continued)

OTHER PUBLICATIONS

Baba, S., et al., "Watermarking Scheme for Copyright Protection of Digital Images," IJCSNS International Journal of Computer Science and Network Security, vol. 9, No. 4, Apr. 2009, pp. 1-9.

(Continued)

*Primary Examiner* — Merilyn P Nguyen
(74) *Attorney, Agent, or Firm* — Nicholson De Vos Webster & Elliott LLP

(57) ABSTRACT

Embodiments are disclosed for performing content authentication. A method of content authentication may include dividing a query video into a plurality of chunks. A feature vector may be generated, using a fingerprinting model, for each chunk from the plurality of chunks. Similar video chunks are identified from a trusted chunk database based on the feature vectors using a multi-chunk search policy. One or more original videos corresponding to the query video are then returned.

18 Claims, 11 Drawing Sheets

(56) References Cited

U.S. PATENT DOCUMENTS

| | | | | |
|---|---|---|---|---|
| 2019/0028766 A1* | 1/2019 | Wold | ............... | G06Q 50/184 |
| 2019/0251111 A1* | 8/2019 | Stojancic | ............ | G06V 10/462 |
| 2020/0336802 A1* | 10/2020 | Russell | ............ | H04N 21/26603 |
| 2021/0248376 A1* | 8/2021 | Zhao | ............ | G06V 20/49 |
| 2023/0153352 A1* | 5/2023 | Mondal | ............ | G06V 10/764 |
| | | | | 707/736 |
| 2024/0073478 A1* | 2/2024 | Black | ............ | G06F 16/7867 |
| 2024/0211512 A1* | 6/2024 | Wu | ............ | G06F 16/7335 |
| 2024/0292073 A1* | 8/2024 | Khalil | ............ | G06V 20/46 |

OTHER PUBLICATIONS

Bharati, A., et al., "Learning Transformation-Aware Embeddings for Image Forensics," arXiv:2001.04547 [cs.CV], Jan. 2020, pp. 1-10.

Black, A., et al., "SimProv: scalable image provenance framework for robust content attribution," Computer Vision and Image Understanding, arXiv:2206.14245v2 [cs.CV], May 8, 2023, pp. 1-8.

Black, A., et al., "VPN: Video Provenance Network for Robust Content Attribution," arXiv:2109.10038v1 [cs.CV], Sep. 21, 2021, pp. 1-10.

Cao, Z., et al., "HashNet: Deep Learning to Hash by Continuation," 2017 IEEE International Conference on Computer Vision (ICCV), Oct. 2017, pp. 5608-5617.

Chen, X., et al., "REFIT: A Unified Watermark Removal Framework For Deep Learning Systems With Limited Data," Proceedings of the 2021 ACM Asia Conference on Computer and Communications Security (Asia CCS '21), May 2021, pp. 321-335.

Choi, K., et al., "A Tutorial on Deep Learning for Music Information Retrieval," arXiv:1709.04396v2 [cs.CV], May 3, 2018, pp. 1-16.

Devi, P., et al., "A Fragile Watermarking Scheme for Image Authentication with Tamper Localization Using Integer Wavelet Transform," Journal of Computer Science, 5(11), Nov. 30, 2009, pp. 831-837.

Dolhansky, B., et al., "The DeepFake Detection Challenge (DFDC) Dataset," arXiv:2006.07397v4 [cs.CV], Oct. 28, 2020, pp. 1-13.

Downie, J.S., "Music Information Retrieval," Annual Review of Information Science and Technology, Ch. 27, 2003, pp. 295-340.

Johnson, J., et al., "Billion-scale similarity search with GPUs," arXiv:1702.08734v1 [cs.CV] Feb. 28, 2017, pp. 1-12.

Liu, H., et al., "Deep Supervised Hashing for Fast Image Retrieval," 2016 IEEE Conference on Computer Vision and Pattern Recognition (CVPR), Jun. 2016, pp. 2064-2072.

Wang, A., "An Industrial-Strength Audio Search Algorithm," ISMIR 2003, 4th International Conference on Music Information Retrieval, Oct. 27-30, 2003, pp. 1-7.

Wang, J., et al., "Hashing for Similarity Search: A Survey," arXiv:1408.2927v1 [cs.DS], Aug. 13, 2014, pp. 1-29.

Westerlund, M., "The Emergence of Deepfake Technology: A Review," Technology Innovation Management Review, vol. 9, Issue 11, Nov. 2019, pp. 39-52.

\* cited by examiner

| VIDEO ID | Chunk 1 702 | | | Chunk 2 704 | |
|---|---|---|---|---|---|
| | 1st NN | 2nd NN | 1st NN | 2nd NN | |
| Video 1 | 0.5 | 1000 | 0.7 | 1000 |
| Video 2 | 1000 | 0.6 | 0.8 | 0.9 |
| Video 3 | 1000 | 1000 | 0.55 | 0.8 |

QUERY VIDEO 700

FIG. 7

SCALABLE VIDEO FINGERPRINTING FOR CONTENT AUTHENTICITY

BACKGROUND

It has become increasingly popular to share information online via video. For example, a number of social media networks are based primarily on sharing videos. However, videos on the Internet can be manipulated in various ways, making it difficult to determine whether a given video represents the original video or if it has been altered. Tracking videos back to their original source is important for various purposes, such as identifying any changes made to the video, retrieving proper attribution, or ensuring that the information contained in the video is legitimate. Additionally, authenticating a video presents further challenges. For example, such video authentication requires searching against a trusted database with millions of rich multi-modal (i.e., audio and visual) feature records.

SUMMARY

Introduced here are techniques/technologies that perform content authentication of videos at scale for longer duration videos. The content authentication system provides a scalable pipeline that enables videos to be matched back to those stored in a trusted database. This can be performed by chunking a query video into equal sized chunks and then identifying similar chunks from known videos in a trusted database. This way partial video fragments or full videos can be matched to corresponding original videos.

Embodiments include optimizations that allow it to scale for millions of longer duration videos (e.g., 5-10 minutes). For example, indexing and searching every chunk can present scalability challenges as the trusted index grows. Instead, embodiments adaptively reduce the number of chunks based on semantic similarity, greatly reducing the number of chunks that must be maintained and searched. When applied to query videos and the index, such adaptive chunking greatly reduces processing time without any loss of accuracy. Additional optimizations, such as compressing video descriptors using product quantization, and using efficient indexing through a similarity search library also improve performance.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 7 illustrates an example of distances of query video chunks to search index chunks in accordance with one or more embodiments;

DETAILED DESCRIPTION

Figure 1:
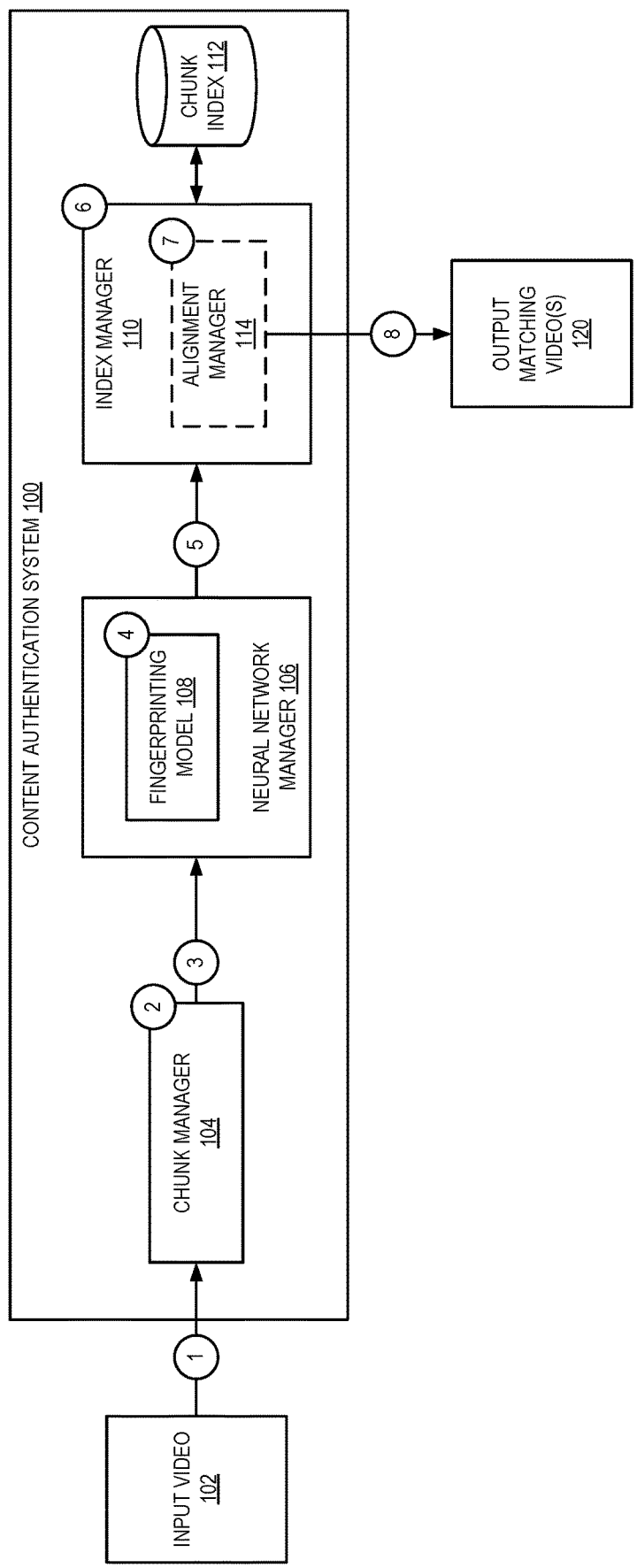
FIG. 1 illustrates a diagram of a process of authenticating content in accordance with one or more embodiments.

One or more embodiments of the present disclosure include a content authentication system. Content authentication attempts to trace a given content item back to its original form and to determine what, if any, kinds of manipulation have been done to it. Conventional content authentication approaches have been based on watermarking techniques, which typically identify the source of the original content item. However, these conventional techniques have not kept up with the challenges posed by modern media manipulation, such as deep fakes and watermark removal techniques. Additionally, standards, such as Coalition for Content Provenance and Authenticity (C2PA) have been developed for content authenticity. This allows for signed metadata or other credentials to be added to video files that describe who made the video, how they made it, etc. However, this metadata often gets stripped from the files when they are uploaded to social media and other web sites. Accordingly, other techniques are needed to identify the original source of a given content item.

One way to attempt to identify the original source of manipulated media is through various fingerprinting techniques. These fingerprinting techniques typically output a key computed from the media content, which is then used to look up provenance information from a trusted database. Scalable and robust fingerprinting methods are available for both audio data and image data. For example, matching audio or audio fragments at scale for music information retrieval (MIR) has been shown to be effective. In the image domain, various fingerprinting methods have been proposed, e.g., robust perceptual hashing, Deep Supervised Hashing (DSH), HashNet, and so on. One image fingerprinting technique, SImProv, provides a scalable image provenance framework, which has been shown to be scalable to 100 million images.

Unlike image or audio authentication, there are limited video content authentication techniques. Such techniques typically focus on detecting various manipulation such as detecting generative (or 'deep fake') content. For example, the Deep Fake Detection Challenge (DFDC) was introduced to detect facial manipulation in a video. In terms of video attribution, the Video Provenance Network (VPN) has been proposed, where CNN-based audio and visual features are used to trace a video to its source. Since searching for such rich visual and audio features is costly, VPN uses a codebook to convert each visual and audio feature into a "bag of words" representation. An efficient search is done via an inverted index and Term Frequency-Inverse Document Frequency (TF-IDF). While this has been shown to be effective for short-length videos (10-15 seconds), it struggles with longer videos.

To address these and other deficiencies in conventional systems, the content authentication system of the present disclosure provides a scalable pipeline that enables videos to be matched back to a trusted database. This allows for partial video fragments or full videos to be matched to corresponding original videos. Embodiments include optimizations that allow it to scale for millions of longer duration (5-10 minutes) videos. Embodiments provide scalability by adaptively reducing the number of chunks based on semantic similarity, compressing video descriptors using product quantization, and using efficient indexing through a similarity search library. Additionally, the content search provided by the content authentication system is robust and insensitive to manipulation, through the use of audio and visual features which learn robust representations via contrastive learning from a large corpus of videos.

FIG. 1 illustrates a diagram of a process of authenticating content in accordance with one or more embodiments. As discussed, content authentication can enable users to identify the provenance of a content item. This refers to determining the original or otherwise canonical version of a content item which has been indexed in a trusted database. In particular, content items may refer to multimedia content, such as video content. The video content is linear content (e.g., it is consumed in an order from beginning to end), which includes audio and video content.

Content authentication system 100 provides an interface through which a user may provide an input video 102 to query a trusted database. The content authentication system 100 may be implemented as a standalone application, hosted service (e.g., as a web application hosted in a cloud computing environment), or incorporated as a tool into another application, system, or service. As shown in FIG. 1, an input video 102 may be received by the content authentication system 100 at numeral 1. In some embodiments, the input video 102 may be uploaded to the content authentication system 100. Additionally, or alternatively, a reference may be provided to the input video 102, such as a URL, URI, or other identifier associated with the input video 102 in a local or remote storage location. The content authentication system 100 may then retrieve the input video 102 from the storage location.

At numeral 2, chunk manager 104 divides the input video 102 into a plurality of fixed length chunks. For example, in some embodiments, each chunk has a constant duration of 10 seconds. Additionally, or alternatively, the chunk length may be selectable by the user, the content authentication system, or other entity. Once the input video has been divided into chunks, those chunks are provided at numeral 3 to fingerprinting model 108. In some embodiments, the chunks may be streamed to the fingerprinting model 108. Alternatively, the chunks may be processed in batches.

The content authentication system may include a neural network manager 106. The neural network manager 106 may host a machine learning model, such as fingerprinting model 108. As such the neural network manager 106 may include various libraries data structures, and any other hardware or software needed to host and execute the fingerprinting model 108 on input video data. Fingerprinting model 108 can be implemented as a neural network. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. In the case of fingerprinting model 108, it may be any machine learning model that generates a feature vector which represents the audio and visual features of a chunk of video data. At numeral 4, the fingerprinting model processes each chunk of the input video generated by chunk manager 104. The fingerprinting model 108 receives a chunk and outputs a feature vector corresponding to the chunk. In some embodiments, the feature vector may be a 2048-dimensional feature vector.

At numeral 5, the feature vectors corresponding to each chunk are provided to index manager 110. The index manager is responsible for generating a bag of words representation of the chunks using the corresponding feature vectors and then querying a chunk index 112 to identify matching chunks, at numeral 6. Although the example of FIG. 1 shows a single database being searched, in various embodiments multiple trusted databases may be searched by the content authentication system 100. These trusted databases may include databases maintained by the content authentication system 100, such as chunk index 112, as well as trusted databases maintained by other organizations, content creators, users, or other entities. In some embodiments, the input video's chunks are clustered into k groups (normally log of total number records) by index manager 110. In some embodiments, clusters are identified based on the feature vectors. For example, feature vectors which are within a threshold distance of one another in the feature space may be identified as belonging to the same cluster. Each cluster may then be assigned a cluster ID.

Once the index manager 110 has clustered the input video chunks, then each chunk is converted to its cluster ID (according to its membership), that is each feature vector is converted to a single integer number (the cluster ID). This allows for a bag of words representation of the video to be generated. Likewise, as discussed further below, a bag of words representation may exist for each video in the trusted index (e.g., chunk index 112). The input video's bag of words representation can be used by the index manager to perform a search-like document retrieval using TF-IDF. Additionally, TF-IDF-based retrieval does not consider order, however videos are sequential content items. Therefore, the sequence of cluster IDs of chunks in videos can be used to calculate an edit distance between the input video chunks and the query results. The query results can then be re-ranked based on the edit distance. This approach may be referred to as an 'Inverted Index'.

Note that 'Inverted Index' converts feature vectors to a single number, which ignores the rich features learned by the model and can lose top retrieval performance. Therefore, it is desirable to build a search index that retains as much information as possible for each chunk. Embodiments may implement various indexing frameworks that provide efficient indexing while also retaining as much information as possible for each chunk. Some examples of such indexing frameworks include, but are not limited to, FAISS and other efficient vector search methods, for example enabled via Product Quantization. For example, some embodiments may be implemented to use a FAISS library which provides a highly efficient framework for indexing features. There are three main indexing types in FAISS:

IndexFlatL2: This indexing type makes an index with a simple list of features. The search is conducted based on L2 distances of features which can be time-consuming. Features are not compressed.

IndexIVFFlat: In this indexing type, features are stored without compression (like IndexFlatL2), but are also clustered into k groups (like the 'Inverted Index' approach). During search time, first, the cluster ID is calculated from the query features and then the nearest neighbor search is conducted from that cluster ID.

IndexIVFPQ: This indexing type is like IndexIVFFlat but implements Product Quantization (PQ) to compress the features. The way PQ works is simple, it first breaks down the original features into m sub-vectors. Then these sub-vectors are clustered into groups and each sub-vector is replaced by its respective cluster ID.

Even in the compressed version of indexing, more information is stored per feature than in the Inverted Indexing approach. Therefore, such indexing mechanisms can perform better than 'Inverted Indexing'. For example, embodiments can store a feature and video ID tuple in the search index, and if there is a single chunk per video (one feature per video), the closest feature can be retrieved given the query feature using one of the indices listed above. From the closest feature, the video ID can be retrieved as both were originally stored as a tuple.

The indexing type used can affect both retrieval time and accuracy of the content authentication system. For example, the following table compares different indexing types, namely Inverted Index, IndexFlatL2, IndexIVFFlat, and IndexIVFPQ. For the performance evaluation shown in the following table, a TF-IDF search policy was used for the Inverted Index, and the Min search policy was used for the others. Also, for IndexIVFPQ, the 2048-dimensional vectors were compressed to 32 dimensions.

| Index Type | Recall @ 1 | Recall @ 10 | Avg Retrieval Time |
|---|---|---|---|
| Inverted Index | 50.58 | 56.60 | 4.42 seconds |
| IndexFlatL2 | 94.06 | 94.64 | 6.86 seconds |
| IndexIVFFlat | 94.06 | 94.64 | 0.30 seconds |
| IndexIVFPQ.32 | 84.62 | 93.31 | 0.02 seconds |

As noted above, the Inverted Index converts feature vectors to single numbers. This loss of information per feature, causes the Inverted Index implementation to have a relatively lower recall rate. The IndexFlatL2 implementation has the best performance in terms of recall rate but also has the highest retrieval time. The IndexIVFFlat implementation maintains a similar recall but retrieves results much faster due to clustering the features. Finally, the IndexIVFPQ.32 implementation (32 being the compression level) further reduces the retrieval time but loses recall performance compared to the other two due to vector compression.

Depending on duration, most videos may have more than one chunk. In such cases, retrieving only based on the closest features for a single feature may not always yield the best possible results. For these reasons, one of several search policies that consider multiple chunks (also referred to as multi-chunk search policies) during aggregation may be used to improve performance. Additional details with respect to these multi-chunk search policies are provided below.

The index manager, using a search policy, identifies one or more videos which the query video is likely to match. Optionally, in some embodiments, the index manager includes an alignment manager 114 which can further process these results before they are returned, at numeral 7. The alignment manager 114 can align the chunks of the query video (e.g., input video 102) to the original video(s) in the query results. This allows for either re-ranking based on which video most closely aligns with the query video and/or matching of the query video to a specific portion of the search results. Additional details about alignment are provided below.

The matching output videos 120 may then be returned at numeral 8. The matching videos may be presented through a user interface which allows the user to view the input video 102 and matching output videos side by side, identify manipulations that have been performed, etc. In some embodiments, the user can update metadata associated with the input video 102 to correspond to the original video or perform other operations.

Figure 2:
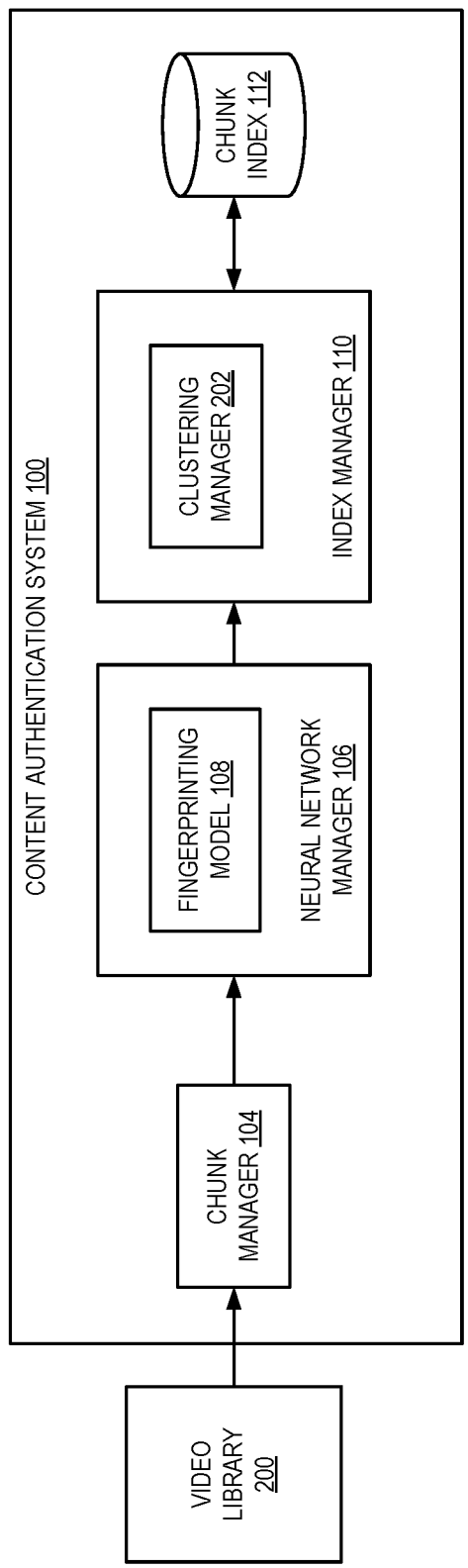
FIG. 2 illustrates a diagram of generating a content index in accordance with one or more embodiments.

FIG. 2 illustrates a diagram of generating a content index in accordance with one or more embodiments. As discussed, embodiments perform content authentication by identifying matching content items that have been indexed in a trusted database to a query content item. As such, the content authentication system 100 enables a trusted database to be built and maintained. In various embodiments, the trusted database is created for a single content creator or rights holder to index their entire video library 200. Additionally, or alternatively, multiple trusted databases may be created and maintained.

In some embodiments, as shown in FIG. 2, a video library 200 can be provided to content authentication system 100 to be indexed. Processing may proceed similarly to that described in FIG. 1, with each video from video library 200 being first processed by chunk manager 104. As discussed, chunk manager 104 can divide an input video into one or more equal sized chunks. Fingerprinting model 108 can generate a feature vector corresponding to each chunk. The chunks and corresponding fingerprints (e.g., feature vectors) may be provided to index manager 110. Index manager 110 can include clustering manager 202 which may implement one or more clustering algorithms to cluster the chunks using their corresponding feature vectors. Chunk index 112 can then be constructed using one of the indexing schemes described above (e.g., IndexFlatL2, IndexIVFFlat, or IndexIVFPQ) to create a trusted index for the video library 200. Subsequently, when a content query is received by content authentication system 100, the chunk index 112 is searched to identify any videos that match the query video (e.g., using the techniques described herein).

Figure 3:
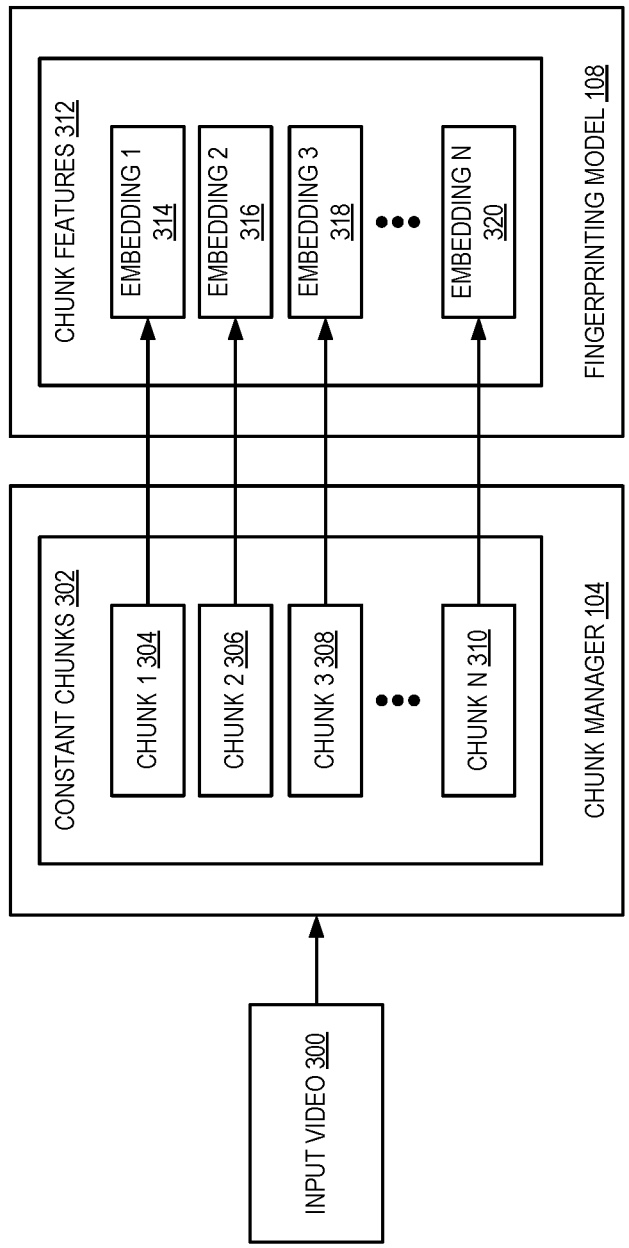
FIG. 3 illustrates a diagram of generating video chunks and extracting their features in accordance with one or more embodiments.

FIG. 3 illustrates a diagram of generating video chunks and extracting their features in accordance with one or more embodiments. FIG. 3 shows one example of generating video chunks using constant chunks. In the example of FIG. 3, an input video 300 is provided to chunk manager 104. This input video may be a video being indexed as part of generating a trusted database or may be a video being used for a query. As discussed, the chunk manager 104 divides videos into chunks. One chunking technique is constant chunking. With constant chunking, a chunk size is fixed (e.g., 5 seconds, 10 seconds, etc.). The chunk size may be preset (e.g., by the user, the content authentication system, or other entity) or may be determined dynamically, such as based on the length of the video.

As shown in FIG. 3, the chunk manager 104 divides the input video into a plurality of constant chunks 302, including chunks 1-N 304-310. These chunks are sequential from the start of the video at chunk 1 304 through the end of the video at chunk N 310. In some embodiments, each chunk is associated with a label, metadata, or other information that identifies where in the sequence of chunks that chunk exists. For example, the chunks may be numbered (e.g., chunk 0 to chunk N), include frame numbers or timestamps, or other information that can be used to identify how the chunks are ordered sequentially. Each chunk is then passed to the fingerprinting model 108 which generates corresponding chunk features 312. In some embodiments, the chunk features 312 include a feature vector (e.g., embedding) corresponding to each chunk. In this example, this results in embeddings 1-N 314-320.

Figure 4:
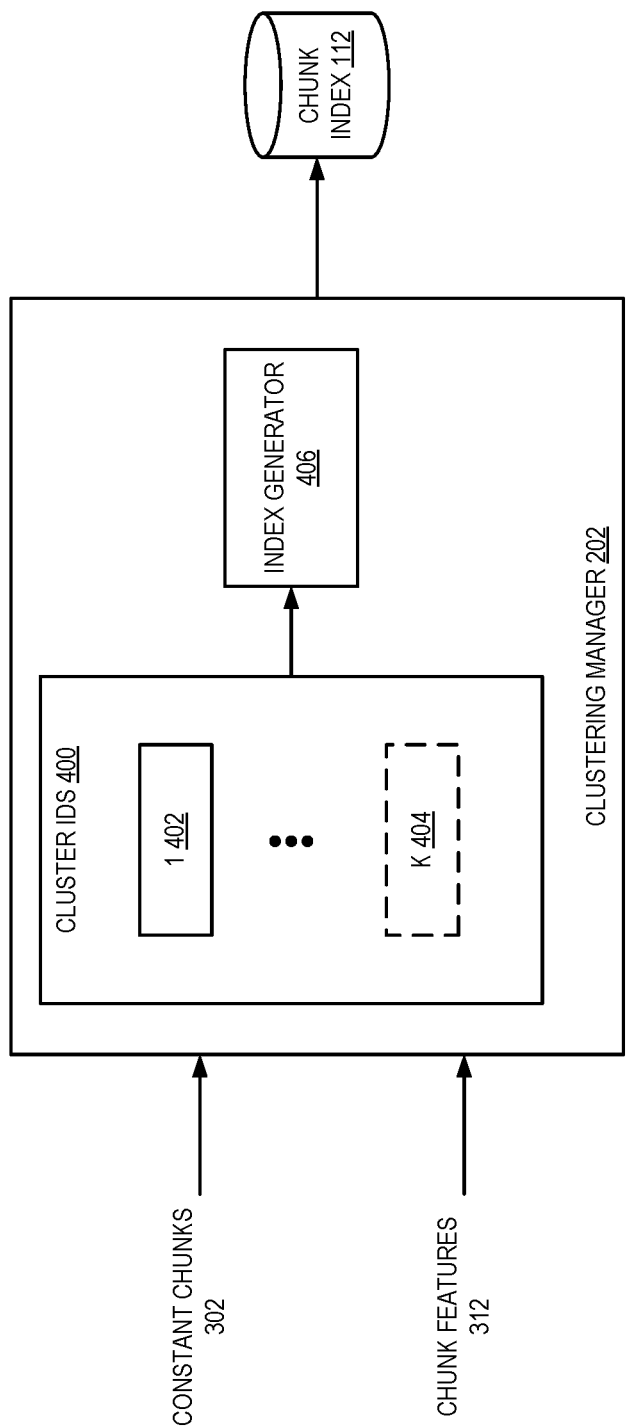
FIG. 4 illustrates a diagram of clustering video chunks in accordance with one or more embodiments.

FIG. 4 illustrates a diagram of clustering video chunks in accordance with one or more embodiments. The constant chunks 302 and the chunk features 312 can then be provided to clustering manager 202. As discussed, clustering manager 202 can implement various clustering techniques to generate one or more clusters of chunks. For example, k-means clustering may be used to group the chunks into k clusters, where each chunk belongs to the cluster having the nearest centroid to its feature vector in the feature space. In some embodiments, the number of clusters is equal to the log of the total number of chunks. Each cluster is assigned a cluster ID 400, which results in clusters 1-k 402-404. As discussed above, these clusters may be used by index generator 406 to create a reverse index for the chunks.

For example, in some embodiments, the FAISS library may be used to implement the index. This allows for one of a number of supported indexes to be used, such as IndexFlatL2, IndexIVFFlat, or IndexIVFPQ. IndexFlatL2 makes an index with a list of uncompressed features. IndexIVFFlat clusters the uncompressed features into k groups and, at search time, a cluster ID is calculated based on the features extracted from the query video and then a nearest neighbor search is conducted using that cluster ID. Alternatively, IndexIVFPQ provides indexing similar to IndexIVFFlat but implements Product Quantization (PQ) to compress the features. The indexing chosen for a given implementation may be based on available resources, size of the video library indexed, etc.

In addition to the different indexing types discussed above, different search policies also affect the performance of the content authentication system. For example, the following table shows recall performance when using different search policies. In each instance, the same indexing type (IndexIVFPQ.32) is used. As shown below, the PriorityCount search policy was found to provide the best recall performance.

| Search Policies | Recall @ 1 | Recall @ 10 |
| --- | --- | --- |
| Min | 84.62 | 93.31 |
| MinCount | 88.54 | 94.64 |
| WeightedCount | 85.95 | 94.90 |
| PriorityCount | 88.62 | 95.57 |
| MinMaxSum | 83.69 | 93.64 |
| DistanceSum | 83.44 | 93.64 |

Figure 5:
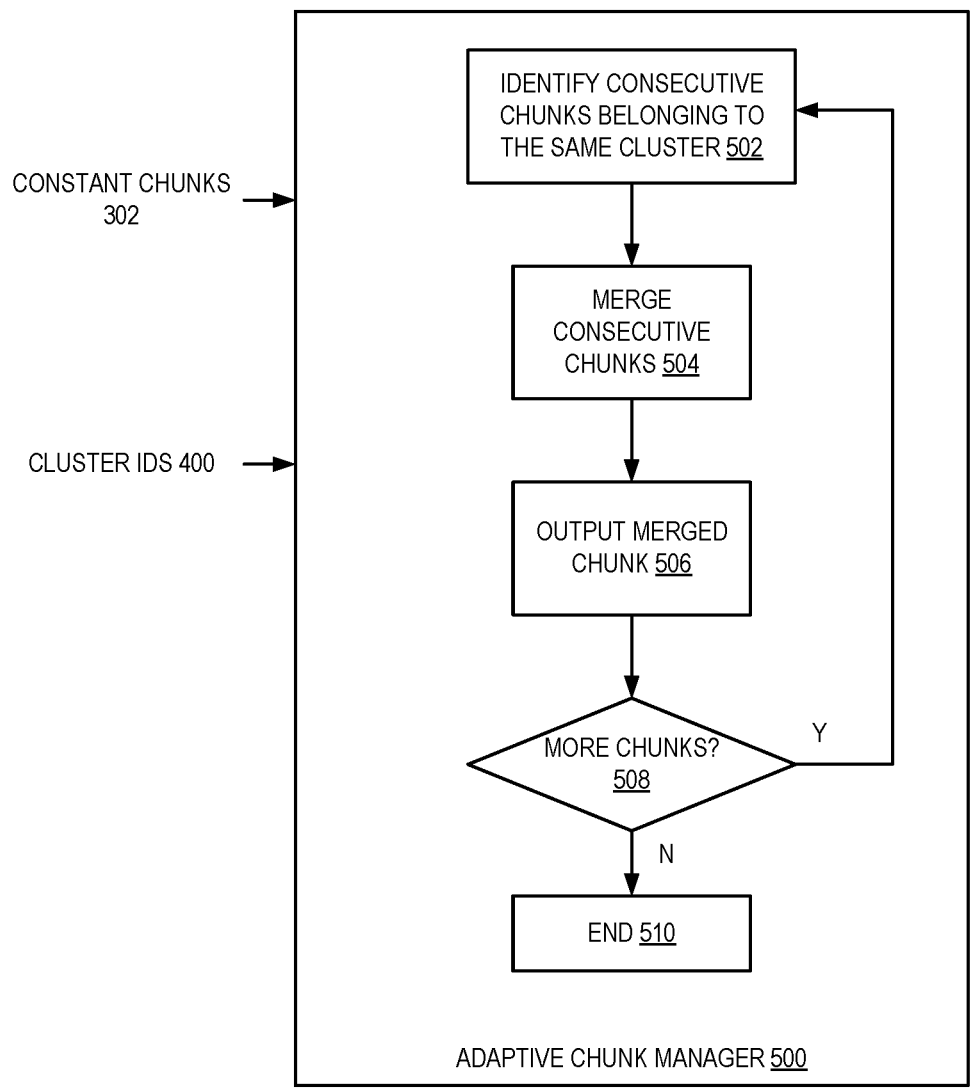
FIG. 5 illustrates a diagram of adaptive chunking in accordance with one or more embodiments.

FIG. 5 illustrates a diagram of adaptive chunking in accordance with one or more embodiments. The above examples have been described with respect to constant chunking, where each chunk is the same length as every other chunk. However, in large libraries of length videos, this may still result in millions or more chunks to index and search. Many of these chunks may include redundant information. For example, consecutive ten second chunks of a video may belong to the same scene of the video, and therefore have very similar features. Adaptive chunking techniques may be implemented to reduce these redundancies and therefore reduce the number of chunks that need to be indexed and searched.

As shown in FIG. 5, an adaptive chunking manager 500 can receive the constant chunks 302 as well as the corresponding cluster IDs 400. Adaptive chunking manager 500 may be implemented as part of chunk manager 104 and may perform adaptive chunking at search time and or at indexing time. At 502, the adaptive chunk manager 500 can identify consecutive chunks that belong to the same cluster ID. Since videos are sequential, chunks follow one another linearly from a start chunk to an end chunk. Consecutive chunks may be identified based on time stamp information, chunk identifiers, or other metadata associated with the chunks when the chunks are generated.

At 504, these consecutive chunks are merged. This may include combining the feature vectors of the consecutive chunks. For example, the feature vectors may be averaged, a centroid or medoid of the feature vectors may be identified, or other combined representation of the feature vectors may be generated. At 506, the merged chunk is output. This serves as the new adaptive chunk for the consecutive chunks. At 508, the adaptive chunk manager 500 determines if there are more chunks. If so processing returns to 502. For example, a cluster may include multiple series of consecutive chunks, but the series may not be consecutive with one another. By continuing processing, each series of consecutive chunks may be reduced to a corresponding adaptive chunk. Likewise, chunks belonging to other clusters may also be able to be merged. As such, processing may continue until all chunks have been processed. If all chunks have been processed, then processing ends at 510 having output the new chunk features for the merged chunks. As a result, adaptive chunking reduces the number of chunks that must be maintained in the index, since one adaptive chunk may represent many constant chunks. This reduces the size of the database which reduces the resources required to support the database.

Figure 6:
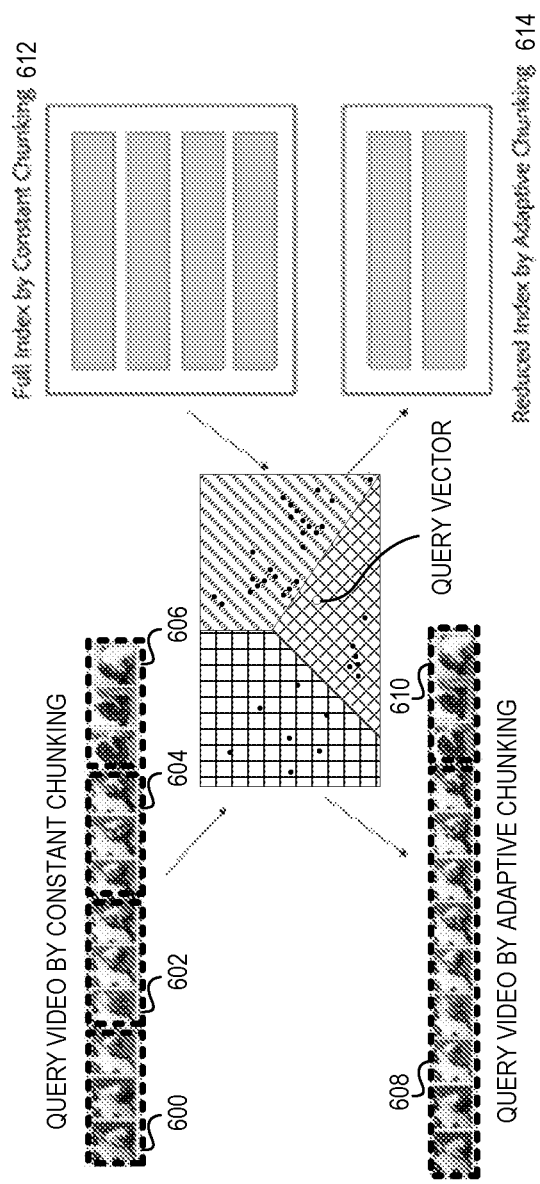
FIG. 6 illustrates an example of reduced indexing by adaptive chunking in accordance with one or more embodiments.

FIG. 6 illustrates an example of reduced indexing by adaptive chunking in accordance with one or more embodiments. As discussed above, adaptive chunking allows for reducing the corpus for the search index. However, adaptive chunking is also useful at search time. This enables the content authentication system to reduce the number of chunks of a query video dynamically. As shown in FIG. 6, constant chunking of a query video may result in four chunks 600-606, whereas adaptive chunking may reduce the number of chunks of this query video to two chunks 608 and 610. This results in fewer query chunks that need to be matched to the index. As shown in FIG. 6, the index can also be reduced using adaptive chunking from the full index 612 to the reduced index 614. By reducing the number of chunks of the query video to be searched and the size of the search index, search time can be greatly reduced. This requires fewer resources for query processing and provides an improved user experience with less waiting or slowdowns from the user's perspective.

As noted, adaptive chunking improves the scalability of the content authentication system. Adaptive chunking can be used to reduce both the size of the trusted index and the number of chunks of the query video. As shown in the following table shows, applying adaptive chunking to both the index and the query video improves search speed without compromising recall.

| Chunking for search | Index Size | Chunking for query | Avg # Query Chunks | Recall @1 | Recall @10 | Avg Retrieval Time |
|---|---|---|---|---|---|---|
| Constant | 4.5 million | Constant | 79.56 | 96.40 | 97.90 | 0.12 seconds |
| Constant | 4.5 million | Adaptive | 48.32 | 89.46 | 97.24 | 0.07 seconds |
| Adaptive | 2.9 million | Constant | 79.56 | 92.55 | 95.73 | 0.07 seconds |
| Adaptive | 2.9 million | Adaptive | 48.32 | 91.05 | 95.23 | 0.04 seconds |

FIG. 7 illustrates an example of distances of query video chunks to search index chunks in accordance with one or more embodiments. As noted above, a number of indexing strategies may be used to generate the trusted database. However, most videos may have more than one chunk. In such cases, retrieving only based on the closest features for a single feature may not always yield the best possible results. Instead, search policies may be used that consider multiple chunks during aggregation. Several such multichunk search policies are available, including Min, MinCount, PriorityCount, MinMaxSum, and DistanceSum. These search policies may be implemented by the index manager, discussed above, and used at search time to identify matching chunks for a query video.

The Min search policy is the simple policy described above. Using the Min search policy for a given query video, the index manager takes the closest features for any of the chunks and retrieve the video IDs based on the distance. The MinCount search policy counts how many times a chunk is matched against the chunks of a video from the database. The greater the number of matches, the higher the rank of a video. In the case of a tie, it is broken by multiplying by the minimum distance. The PriorityCount search policy is similar to the MinCount search policy, but priority is given based on the order of nearest neighbors. That is, first, it only considers the first nearest neighbors and then counts how many chunks from the query video are matched against the chunks of a video in the database. Then when all of the videos are retrieved in the first nearest neighbor, it moves on to the second (and third, fourth, and so on) nearest neighbor. For each subsequent nearest neighbor, it only considers video IDs that were not considered before. In the case of a tie, it is broken by multiplying by the minimum distance. The MinMaxSum search policy considers, for each chunk, only the minimum distance for all nearest neighbors. If no distance is available, it considers the default maximum distance. Then it adds the distances and sorts the results according to minimum distances. The DistanceSum search policy is similar to the MinMaxSum search policy, but it considers all of the distances for all nearest neighbors. The differences between these search policies are discussed below with respect to the example of FIG. 7.

In the example of FIG. 7, the query video 700 has 2 chunks 702-704. For each chunk, the distances for the first and second nearest neighbors (NN) from the search index are shown along with the video ID. In this example, if there is no nearest neighbor retrieved for a given chunk, then an arbitrarily large number (e.g., 1000 in this example) is assigned. Now according to descriptions of the search policies, the following examples show how results will be retrieved:

Using the Min search policy, the closest values for each video are: Video 1: 0.5, Video 2: 0.6, and Video 3: 0.55. Sorting based on the closest values results in the following ranking: Video 1, Video 3, Video 2

Using the MinCount search policy, the values for each video are determined to be: Video 1: 2*(0.9-0.5)/(0.9-0.5)=2, Video 2: 3*(0.9-0.6)/(0.9-0.5)=2.25, Video 3: 2*(0.9-0.55)/(0.9-0.5)=1.75. Sorting based on these values results in the following ranking: Video 2, Video 1, Video 3.

Using the PriorityCount search policy, the values for each video are determined to be: Values: Video 1: 2*(1000-0.5), Video 2: 1*(1000-0.8), Video 3: 1*(1000-0.55). Sorting based on these values results in the following ranking: Video 1, Video 3, Video 2

Using the MinMaxSum search policy, the values for each video are determined to be: Video 1:0.5+0.7, Video 2:0.6+0.8, Video 3: 1000+0.55. Sorting based on these values results in the following ranking: Video 1, Video 2, Video 3

Using the DistanceSum search policy, the values for each video are determined to be: Video 1:0.5+1000+0.7+1000, Video 2: 1000+0.6+0.8+0.9, Video 3: 1000+1000+0.55+0.8. Sorting based on these values results in the following ranking: Video 2, Video 1, Video 3

Figure 8:
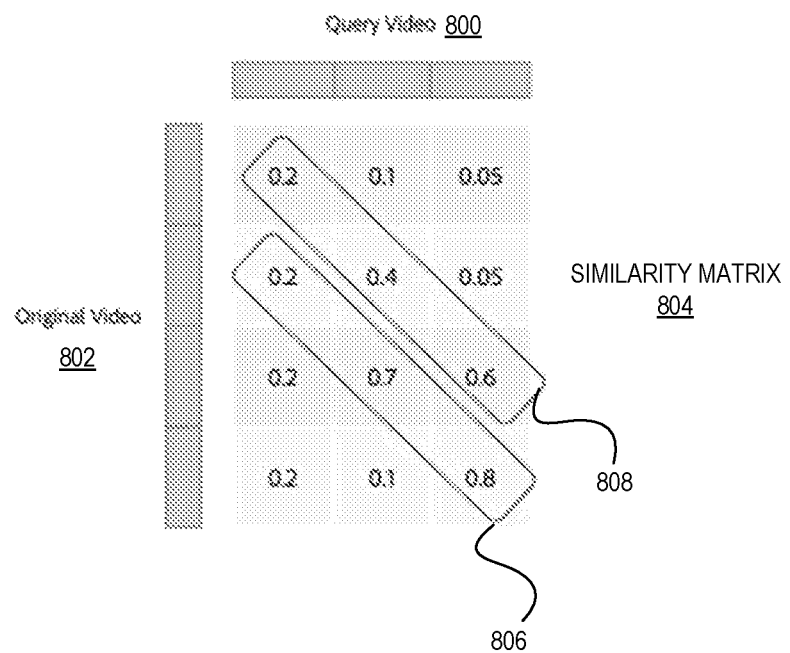
FIG. 8 illustrates an example of video alignment using a distance matrix in accordance with one or more embodiments.

FIG. 8 illustrates an example of video alignment using a distance matrix in accordance with one or more embodiments. After retrieving the top results, the query video (e.g., input video 102) can be aligned with the original video by computing chunk-wise distances and ranking the consecutive sequences based on the calculated distances. As shown in FIG. 8, the query video 800 includes three chunks and the original video 802 includes at least four chunks. A similarity matrix 804 can be constructed to perform alignment. Each cell of the similarity matrix can include a distance metric representing the distance between the chunk of the query video 800 and the chunk of the original video 802 corresponding to the cell. In some embodiments, the distance metric is L2 distance/cosine similarity.

Because the videos are sequential, alignment of the query video to the original video is performed based on the distance values of diagonals (e.g., 806, 808) of the matrix. This is because the chunks must be similar to one another in sequence, not in isolation, for there to be a likely match. When alignment has been identified (e.g., the sequence of chunks in the original video that is most similar to the sequence of chunks from the query), this section of the original video may be returned or highlighted to the user as being a match to the query video.

Figure 9:
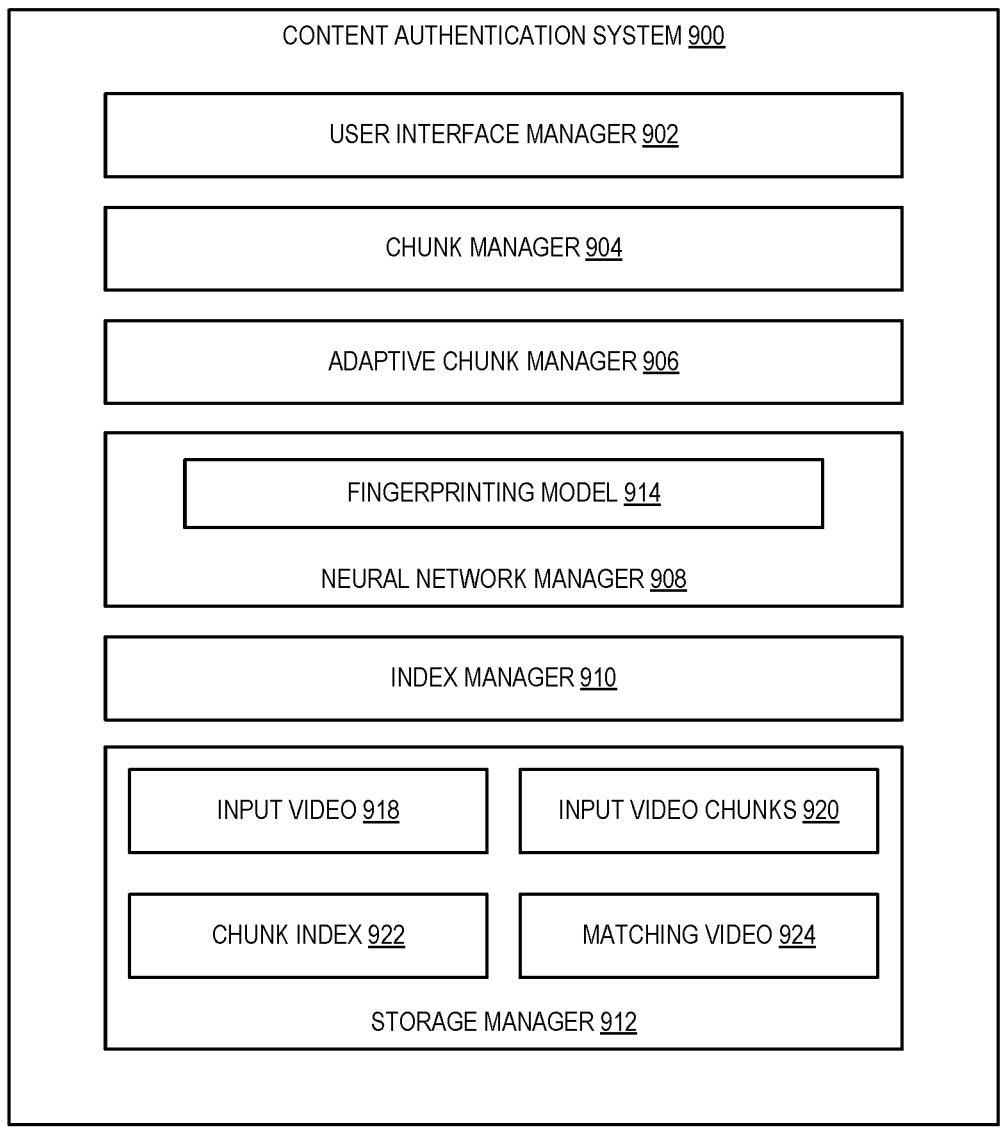
FIG. 9 illustrates a schematic diagram of a content authentication system in accordance with one or more embodiments.

FIG. 9 illustrates a schematic diagram of a content authentication system (e.g., "content authentication system" described above) in accordance with one or more embodiments. As shown, the content authentication system 900 may include, but is not limited to, user interface manager 902, chunk manager 904, adaptive chunk manager 906, neural network manager 908, index manager 910, and storage manager 912. The neural network manager 908 includes a fingerprinting model 914. The storage manager 912 includes input video 918, input video chunks 920, chunk index 922, and matching video 924.

As illustrated in FIG. 9, the image generation system 900 includes a user interface manager 902. For example, the user interface manager 902 allows users to provide input image data to the image generation system 900. In some embodiments, the user interface manager 902 provides a user interface through which the user can upload the input video 918 which represents the query video whose provenance is being searched, as discussed above. Alternatively, or additionally, the user interface may enable the user to download the input video from a local or remote storage location (e.g., by providing an address (e.g., a URL or other endpoint) associated with a video source).

Additionally, the user interface manager 902 allows users to request the content authentication system 900 to authenticate the input video by searching for a corresponding original video in a trusted database, such as chunk index 922. In some embodiments, the user interface manager 902 enables the user to view any video(s) 924 identified as part of the content authentication process, as described above.

As illustrated in FIG. 9, the content authentication system 900 includes a chunk manager 902. The chunk manager 902 can receive an input video and divide the input video into a plurality of chunks. As discussed, the chunk manager 904 may be configured to generate constant-sized chunks, where each chunk is of the same size (e.g., 10 seconds, or other configurable length of time). The chunk manager 902 can implement any video editing techniques that allow for dividing (e.g., splitting, etc.) a video into smaller portions. In some embodiments, the chunk manager 904 may include, or coordinate with adaptive chunk manager 906, to reduce the number of chunks that need to be stored and/or searched, as discussed.

As illustrated in FIG. 9, the content authentication system 900 also includes an adaptive chunk manager 906. As discussed, adaptive chunk manager may be used to reduce the number of chunks that need to be stored or searched when compared with constant chunking. The adaptive chunking manager identifies redundant chunks and merges these chunks, which allows for one merged chunk to represent multiple constant chunks. Redundancy is determined based on the feature vectors associated with the chunks. This way, the chunks are determined to be redundant because they have semantically similar features.

In particular, the adaptive chunk manager receives the constant chunks and corresponding cluster IDs and identifies consecutive constant chunks that belong to the same cluster. The adaptive chunk manager then merges these consecutive chunks into a single chunk with a corresponding merged feature vector. The merged feature vector may be an average of the merged constant chunks' feature vectors, such as a mean, centroid, medoid, etc. This can be applied to all of the constant chunks for a video library, reducing the number of chunks that need to be maintained in a trusted database. Likewise, it can be applied at query time to a query video, reducing the number of chunks that need to be queried against the trusted database. Both of these benefits result in a more scalable, faster performing content authentication system.

As illustrated in FIG. 9, the content authentication system 900 also includes a neural network manager 908. Neural network manager 908 may host a plurality of neural networks or other machine learning models, such as fingerprinting model 914. The neural network manager 908 may include an execution environment, libraries, and/or any other data needed to execute the machine learning models. In some embodiments, the neural network manager 908 may be associated with dedicated software and/or hardware resources to execute the machine learning model(s). As discussed, fingerprinting model 914 can be implemented as any type of machine learning model which can be trained to encode multi-modal features (e.g., audio and video features) of an input video (e.g., a video chunk) into a feature vector (e.g., an embedding). Although depicted in FIG. 9 as being hosted by a single neural network manager 908, in various embodiments the neural networks may be hosted in multiple neural network managers and/or as part of different components. For example, fingerprinting model 914 can be hosted by its own neural network manager, or other host environment, in which the neural network executes. In some embodiments, the neural network manager may host other models in addition to the fingerprinting model 914.

As illustrated in FIG. 9, the content authentication system 900 also includes index manager 910. As discussed, index manager 910 is responsible for building a trusted database of video content as well as for searching the trusted database for similar chunks at query time. For example, the index manager 910 can implement one or more search policies, as described above, for searching the trusted database (e.g., chunk index 922). In particular, the search policies may include multi-chunk search policies, as discussed above. Additionally, in some embodiments, the index manager 910 includes an alignment manager which allows for a specific portion of a trusted video to be identified which corresponds to the query video by identifying a closest chunk sequence. The index manager 910 may also be responsible for clustering the constant chunks into a plurality of clusters and generating corresponding cluster IDs. These clusters may be used for adaptive chunking as well as for building the chunk index, as discussed.

As illustrated in FIG. 9, the content authentication system 900 also includes the storage manager 912. The storage manager 912 maintains data for the content authentication system 900. The storage manager 912 can maintain data of any type, size, or kind as necessary to perform the functions of the content authentication system 900. The storage manager 912, as shown in FIG. 9, includes the input video 918. Input video 918 may be received when generating, or adding to, a trusted chunk index of a video library, or as a query video that will be chunked and queried against the trusted index. In some embodiments, the input video 918 may be stored by the storage manager while it is being chunked and then discarded. Additionally, or alternatively, the storage manager may maintain a copy of the input video until it is erased from, or otherwise discarded by, the content authentication system (e.g., upon completion of the content authentication task, at user direction, based on data retention policies or agreements, etc.).

As further illustrated in FIG. 9, the storage manager 912 also includes input video chunks 920. Input video chunks 920 can include the constant chunks and/or adaptive chunks generated from the input video 918 and utilized by the content authentication system 900 to search and/or index the input video. The storage manager 912 may also include chunk index 922. The chunk index 922 may include a plurality of video chunks corresponding to a plurality of videos. Each video with chunks in the chunk index 922 is associated with trusted metadata identifying who created the video, when the video was created, how the video was created, etc. The chunk index 922 therefore serves as a trusted video index which can be used to determine the provenance of a given video. The chunk index 922 may be maintained by a specific content creator or rightsholder, a trusted third party which maintains the index on behalf of various creators and/or rightsholders, or other entity. The storage manager 910 may further include matching video 924. The matching video 924 may correspond to a most similar video to a query video identified by the index manager 910 using the chunk index 922. The matching video 924 and/or its corresponding trusted metadata may be returned in response to a content authentication query.

Each of the components 902-912 of the content authentication system 900 and their corresponding elements (as shown in FIG. 9) may be in communication with one another using any suitable communication technologies. It will be recognized that although components 902-912 and their corresponding elements are shown to be separate in FIG. 9, any of components 902-912 and their corresponding elements may be combined into fewer components, such as into a single facility or module, divided into more components, or configured into different components as may serve a particular embodiment.

The components 902-912 and their corresponding elements can comprise software, hardware, or both. For example, the components 902-912 and their corresponding elements can comprise one or more instructions stored on a computer-readable storage medium and executable by processors of one or more computing devices. When executed by the one or more processors, the computer-executable instructions of the content authentication system 900 can cause a client device and/or a server device to perform the methods described herein. Alternatively, the components 902-912 and their corresponding elements can comprise hardware, such as a special purpose processing device to perform a certain function or group of functions. Additionally, the components 902-912 and their corresponding elements can comprise a combination of computer-executable instructions and hardware.

Furthermore, the components 902-912 of the content authentication system 900 may, for example, be implemented as one or more stand-alone applications, as one or more modules of an application, as one or more plug-ins, as one or more library functions or functions that may be called by other applications, and/or as a cloud-computing model. Thus, the components 902-912 of the content authentication system 900 may be implemented as a stand-alone application, such as a desktop or mobile application. Furthermore, the components 902-912 of the content authentication system 900 may be implemented as one or more web-based applications hosted on a remote server. Alternatively, or additionally, the components of the content authentication system 900 may be implemented in a suite of mobile device applications or "apps."

As shown, the content authentication system 900 can be implemented as a single system. In other embodiments, the content authentication system 900 can be implemented in whole, or in part, across multiple systems. For example, one or more functions of the content authentication system 900 can be performed by one or more servers, and one or more functions of the content authentication system 900 can be performed by one or more client devices. The one or more servers and/or one or more client devices may generate, store, receive, and transmit any type of data used by the content authentication system 900, as described herein.

In one implementation, the one or more client devices can include or implement at least a portion of the content authentication system 900. In other implementations, the one or more servers can include or implement at least a portion of the content authentication system 900. For instance, the content authentication system 900 can include an application running on the one or more servers or a portion of the content authentication system 900 can be downloaded from the one or more servers. Additionally or alternatively, the content authentication system 900 can include a web hosting application that allows the client device(s) to interact with content hosted at the one or more server(s).

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 11. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 11.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 11.

Figure 10:
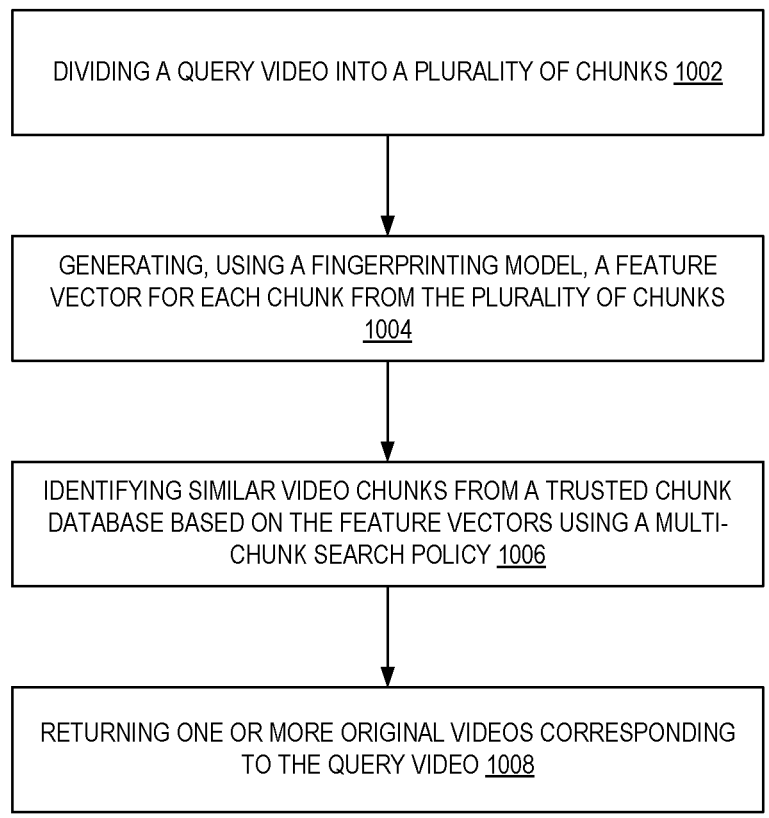
FIG. 10 illustrates a flowchart of a series of acts in a method of content authentication in accordance with one or more embodiments.

FIGS. 1-9, the corresponding text, and the examples, provide a number of different systems and devices that allow a user to authenticate content. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of content authentication in accordance with one or more embodiments. In one or more embodiments, the method 1000 is performed in a digital medium environment that includes the content authentication system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of dividing a query video into a plurality of chunks. As discussed, a query video may be provided by a user, another system or service, or other entity to a content authentication system to search for a corresponding original video. The query video may be uploaded to the content authentication system, provided via a reference to a storage location, etc. In some embodiments, a duration of the query video is greater than five minutes. In some embodiments, the query video may be divided into a plurality of equal sized chunks, called constant chunking. Additionally, in some embodiments, adaptive chunking may be used to remove redundant chunks from being indexed or searched.

For example, in some embodiments, the plurality of chunks are clustered into a plurality of clusters based on their corresponding feature vectors and each cluster is assigned a cluster identifier. Adaptive chunking may include identifying a plurality of consecutive chunks associated with a same cluster identifier and merging the plurality of consecutive chunks into a merged chunk. A combined feature vector corresponding to the merged chunk can then be generated. In some embodiments, the combined feature vector is an average of a plurality of feature vectors associated with the plurality of consecutive chunks.

As illustrated in FIG. 10, the method 1000 also includes an act 1004 of generating, using a fingerprinting model, a feature vector for each chunk from the plurality of chunks. In some embodiments, the fingerprinting model may be trained to encode the video and audio features of the chunk into a feature vector (e.g., an embedding). This feature vector may then be associated with the chunk and used for further processing.

As illustrated in FIG. 10, the method 1000 also includes an act 1006 of identifying similar video chunks from a trusted chunk database based on the feature vectors using a multi-chunk search policy. In some embodiments, identifying similar video chunks from a trusted chunk database may further include determining nearest neighbor values for a plurality of query chunks and a plurality of trusted chunks from the trusted chunk database, and sorting the videos from the trusted chunk database based on the nearest neighbor values.

As illustrated in FIG. 10, the method 1000 also includes an act 1008 of returning one or more original videos corresponding to the query video. In some embodiments, the original video may be aligned with the query video, such that the most relevant portion(s) of the original video are presented to the user. In some embodiments, this may include aligning the query video with an original video by computing chunk-wise distances of a plurality of consecutive chunk sequences from the original video and ranking the plurality of consecutive chunk sequences based on the chunk-wise distances.

In some embodiments, a method of generating a search index for a trusted video database may include the steps of obtaining a video library comprising a plurality of digital videos, for each digital video from the video library dividing the digital video into a plurality of chunks, and generating, using a fingerprinting model, a feature vector for each chunk from the plurality of chunks, and generating a search index for the plurality of chunks obtained for the digital library.

In some embodiments, the operations further include clustering the plurality of chunks into a plurality of clusters based on their corresponding feature vectors, and assigning each cluster a cluster identifier. In some embodiments, the operations further include identifying a plurality of consecutive chunks associated with a same cluster identifier, and merging the plurality of consecutive chunks into a merged chunk. In some embodiments, generating a search index for the plurality of chunks obtained for the digital library further includes generating a combined feature vector corresponding to the merged chunk, wherein the combined feature vector is an average of a plurality of feature vectors associated with the plurality of consecutive chunks, and generating the search index using the merged chunk and the combined feature vector.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
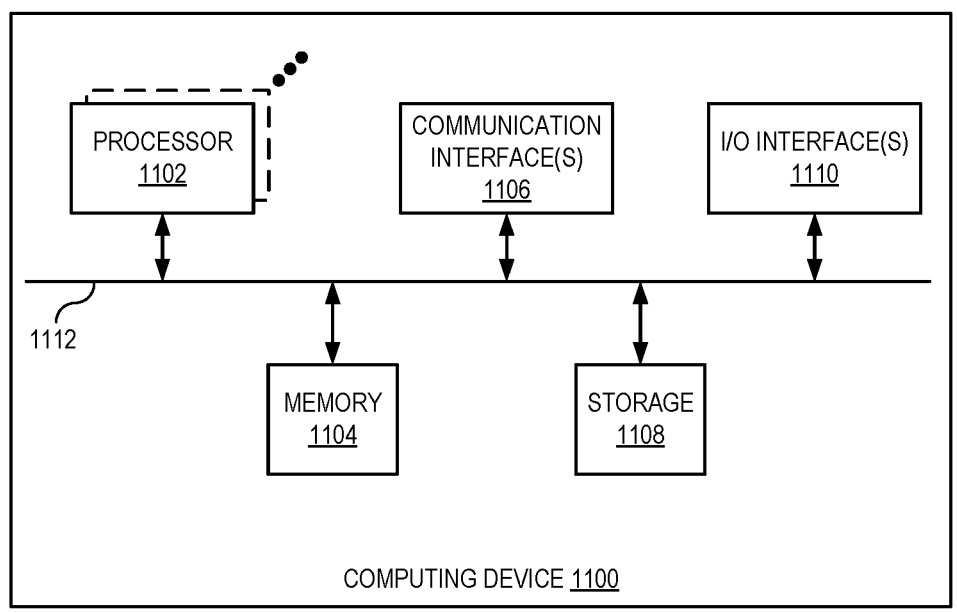
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the content authentication system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   dividing a query video into a plurality of chunks;
   generating, using a fingerprinting model, a feature vector for each chunk from the plurality of chunks of the query video;
   identifying similar video chunks from a trusted chunk database based on the feature vectors by:
   determining nearest neighbor values for the plurality of chunks of the query video and a plurality of trusted chunks corresponding to videos from the trusted chunk database, and
   sorting the videos from the trusted chunk database based on the nearest neighbor values; and
   returning one or more original videos corresponding to the query video based on the identified similar video chunks.

2. The method of claim 1, wherein dividing a query video into a plurality of chunks, further comprises:
   clustering the plurality of chunks into a plurality of clusters based on their corresponding feature vectors; and
   assigning each cluster a cluster identifier.

3. The method of claim 2, further comprising:
   identifying a plurality of consecutive chunks associated with a same cluster identifier; and
   merging the plurality of consecutive chunks into a merged chunk.

4. The method of claim 3, further comprising:
   generating a combined feature vector corresponding to the merged chunk.

5. The method of claim 4, wherein the combined feature vector is an average of a plurality of feature vectors associated with the plurality of consecutive chunks.

6. The method of claim 1, further comprising:
   aligning the query video with an original video by computing chunk-wise distances of a plurality of consecutive chunk sequences from the original video; and
   ranking the plurality of consecutive chunk sequences based on the chunk-wise distances.

7. The method of claim 1, wherein a duration of the query video is greater than five minutes.

8. A non-transitory computer-readable medium storing executable instructions, which when executed by a processing device, cause the processing device to perform operations comprising:
   dividing a query video into a plurality of chunks;
   generating, using a fingerprinting model, a feature vector for each chunk from the plurality of chunks of the query video;
   identifying similar video chunks from a trusted chunk database based on the feature vectors by:
   determining nearest neighbor values for the plurality of chunks of the query video and a plurality of trusted chunks corresponding to videos from the trusted chunk database, and
   sorting the videos from the trusted chunk database based on the nearest neighbor values; and
   returning one or more original videos corresponding to the query video based on the identified similar video chunks.

9. The non-transitory computer-readable medium of claim 8, wherein the operation of dividing a query video into a plurality of chunks, further comprises:
   clustering the plurality of chunks into a plurality of clusters based on their corresponding feature vectors; and
   assigning each cluster a cluster identifier.

10. The non-transitory computer-readable medium of claim 9, wherein the operations further comprise:
    identifying a plurality of consecutive chunks associated with a same cluster identifier; and
    merging the plurality of consecutive chunks into a merged chunk.

11. The non-transitory computer-readable medium of claim 10, wherein the operations further comprise:
    generating a combined feature vector corresponding to the merged chunk.

12. The non-transitory computer-readable medium of claim 11, wherein the combined feature vector is an average of a plurality of feature vectors associated with the plurality of consecutive chunks.

13. The non-transitory computer-readable medium of claim 8, wherein the operations further comprise:
    aligning the query video with an original video by computing chunk-wise distances of a plurality of consecutive chunk sequences from the original video; and
    ranking the plurality of consecutive chunk sequences based on the chunk-wise distances.

14. The non-transitory computer-readable medium of claim 8, wherein a duration of the query video is greater than five minutes.

15. A system comprising:
    a memory component; and
    a processing device coupled to the memory component, the processing device to perform operations comprising:
    obtaining a video library comprising a plurality of digital videos;
    for each digital video from the video library:
    dividing the digital video into a plurality of chunks; and
    generating, using a fingerprinting model, a feature vector for each chunk from the plurality of chunks of the digital video;
    clustering the plurality of chunks into a plurality of clusters based on corresponding feature vectors for the plurality of chunks; and generating a search index for the plurality of chunks obtained for the digital library based on cluster data for the plurality of clusters.

16. The system of claim 15, wherein the operations further comprise:
assigning each cluster a cluster identifier.

17. The system of claim 16, wherein the operations further comprise:
identifying a plurality of consecutive chunks associated with a same cluster identifier; and
merging the plurality of consecutive chunks into a merged chunk.

18. The system of claim 17, wherein the operation of generating a search index for the plurality of chunks obtained for the digital library further comprises:
generating a combined feature vector corresponding to the merged chunk, wherein the combined feature vector is an average of a plurality of feature vectors associated with the plurality of consecutive chunks; and
generating the search index using the merged chunk and the combined feature vector.

* * * * *